(12) United States Patent
White-Ellul (10) Patent No.: US 10,423,957 B2
(45) Date of Patent: Sep. 24, 2019

(54) SYSTEMS AND METHODS USING AN AUTHENTICATION AND PAYMENT PROCESSING PLATFORM

(71) Applicant: MasterCard International Incorporation, Purchase, NY (US)

(72) Inventor: Shirley White-Ellul, Montgomery City, MO (US)

(73) Assignee: Mastercard International Incorporated, Purchase, NY (US)

( * ) Notice: Subject to any disclaimer, the term of this patent is extended or adjusted under 35 U.S.C. 154(b) by 566 days.

(21) Appl. No.: 14/949,082

(22) Filed: Nov. 23, 2015

(65) Prior Publication Data

US 2017/0148028 A1    May 25, 2017

(51) Int. Cl.
| | | |
|---|---|---|
| *G06Q 40/00* | (2012.01) | |
| *G06Q 20/40* | (2012.01) | |
| *G06Q 20/42* | (2012.01) | |
| *G06Q 20/32* | (2012.01) | |
| *G06Q 20/10* | (2012.01) | |
| *G06Q 20/34* | (2012.01) | |

(52) U.S. Cl.
CPC ....... *G06Q 20/40145* (2013.01); *G06Q 20/10* (2013.01); *G06Q 20/32* (2013.01); *G06Q 20/35785* (2013.01); *G06Q 20/42* (2013.01)

(58) Field of Classification Search
USPC .................................................... 705/35–40
See application file for complete search history.

(56) References Cited

U.S. PATENT DOCUMENTS

| | | | |
|---|---|---|---|
| 7,853,535 B2 | 12/2010 | Colella | |
| 8,622,309 B1 | 1/2014 | Mullen et al. | |
| 2006/0180660 A1* | 8/2006 | Gray | G06Q 20/24 235/380 |
| 2006/0277412 A1 | 12/2006 | Mandke | |
| 2007/0255662 A1* | 11/2007 | Tumminaro | G06Q 20/027 705/79 |
| 2007/0267504 A1* | 11/2007 | Beeson | G06Q 20/32 235/492 |
| 2008/0320577 A1 | 12/2008 | Larduinat | |

(Continued)

OTHER PUBLICATIONS

Business Wire: "airtel Africa, Standard Chartered Bank and MasterCard Honored for Mobile Payments Innovation at Mobile World Congress", New York, Feb. 21, 2011 (Year: 2011).*

*Primary Examiner* — Edward J Baird
(74) *Attorney, Agent, or Firm* — Buckley, Maschoff & Talwalkar LLC (57) ABSTRACT

An electronic payment instruction file associated with a payer identifier and a payee identifier from a remote payer device may be received. Information about the electronic file may be stored into a transaction database. An authorization and payment processing server may retrieve, from the transaction database, the information about the electronic payment instruction file and automatically arrange for funds to be transferred from a payment account associated with the payer identifier to an account associated with the payee identifier. The authorization and payment processing server may then transmit a confirmation signal to the remote payer device confirming that the payment has been completed without transmitting any information to any device associated with the payee identifier at the location of the transaction.

16 Claims, 11 Drawing Sheets

(56) References Cited

U.S. PATENT DOCUMENTS

| | | | | |
|---|---|---|---|---|
| 2009/0204530 A1* | 8/2009 | Hanson | ............... | G06Q 20/10 |
| | | | | 705/35 |
| 2011/0035318 A1* | 2/2011 | Hargrove | ............ | G06Q 20/12 |
| | | | | 705/44 |
| 2011/0320037 A1 | 12/2011 | Frugone | | |
| 2012/0296725 A1* | 11/2012 | Dessert | ............ | G06Q 30/0208 |
| | | | | 705/14.27 |
| 2013/0080333 A1 | 3/2013 | Kamotskyy et al. | | |
| 2013/0185214 A1* | 7/2013 | Azen | ................ | G06Q 20/206 |
| | | | | 705/76 |
| 2014/0058855 A1* | 2/2014 | Hussein | ............ | G06Q 20/405 |
| | | | | 705/16 |
| 2014/0337149 A1* | 11/2014 | Ke | ...................... | G06F 3/017 |
| | | | | 705/15 |
| 2015/0332258 A1* | 11/2015 | Kurabi | .............. | G06Q 20/401 |
| | | | | 705/71 |
| 2016/0224973 A1* | 8/2016 | Van Os | .............. | G06Q 20/32 |
| 2017/0132633 A1* | 5/2017 | Whitehouse | ...... | G06Q 20/4014 |

\* cited by examiner

SYSTEMS AND METHODS USING AN AUTHENTICATION AND PAYMENT PROCESSING PLATFORM

BACKGROUND

A person may want to transfer funds to a merchant, school system, charity event, etc. For example, a payer (the person providing the money) may want to donate $5.00 to a local elementary school bake sale, a children's sports league, or other payee (the party or event receiving the money). It is known that a payee can purchase, install, and maintain various hardware and/or software systems to receive payments from payers. For example, many different Point Of Sale ("POS") devices are available to confirm that a payer has successfully transferred funds to a payee. In some cases, however, it may be impractical to purchase, install, and/or maintain hardware and software systems to receive payments. For example, suitable wired or wireless communications might not be available at an entry gate of a local high school football stadium. Moreover, installing such systems can be impractically expensive and time consuming, especially when the amount of funds being transferred is relatively small and/or the risk of fraud is relatively low (e.g., at a middle school charity event to raise money for the school's library).

It would therefore be desirable to provide accurate and efficient systems and methods to facilitate a transfer of funds from a payer account to a payee.

DETAILED DESCRIPTION

A person may want to transfer funds to a merchant, school system, charity event, etc. For example, a payer (the person providing the money) may want to pay $10.00 to watch a play performed by students of a school district, donate money to a walk-a-thon, or some other payee (the party or event receiving the money). It is known that a payee can purchase, install, and maintain various hardware and/or software systems to receive payments. For example, many different POS devices are available to verify that a payer has successfully transferred funds to a payee (e.g., via a credit or debit card account). In some cases, however, it may be impractical to purchase, install, and/or maintain hardware and software systems to receive payments. For example, suitable wired or wireless communications might not be available at a local little league baseball field. Moreover, installing such systems can be impractically expensive and time consuming, especially when the amount of funds being transferred is relatively small and/or the risk of fraud is relatively low (e.g., for a cancer awareness walk-a-thon).

Figure 1:
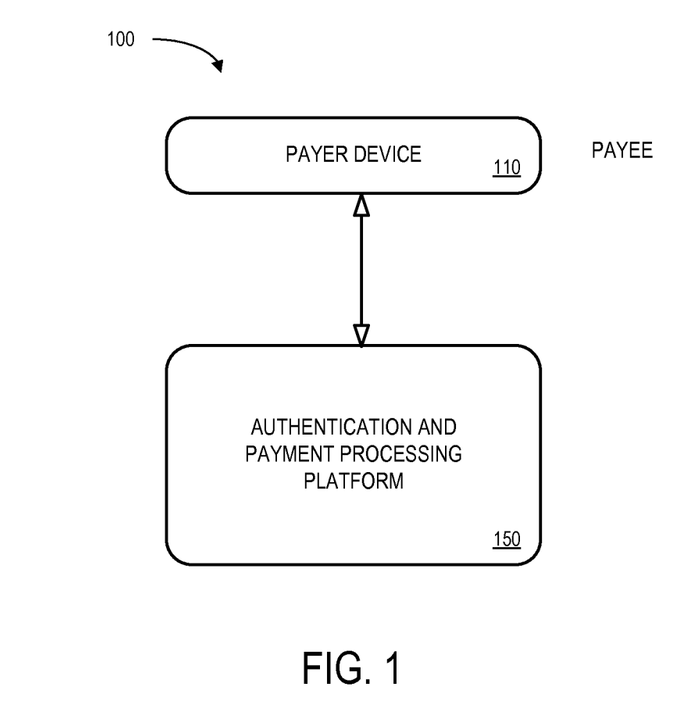
FIG. 1 is a high level block architectures overview of a system in accordance with some embodiments.

It would therefore be desirable to provide accurate and efficient systems and methods to facilitate a transfer of funds from a payer account to a payee. FIG. 1 is a high level block architectures overview of a system 100 in accordance with some embodiments. In particular, the system 100 includes a payer device 110 (e.g., a smartphone, smart watch, or similar type of device) that exchanges information with an authentication and payment processing platform. A payer associated with the payer device 110 may use the authentication and payment processing platform 150 to transfer funds to a payee (e.g., a school district or charity event). As will be described herein, the transaction may be completed without transmitting any information to any device associated with the payee. In this way, the system 100 may be appropriate in situations where a relatively small amount of funds are being transferred and/or the risk of fraud is relatively low.

Figure 2:
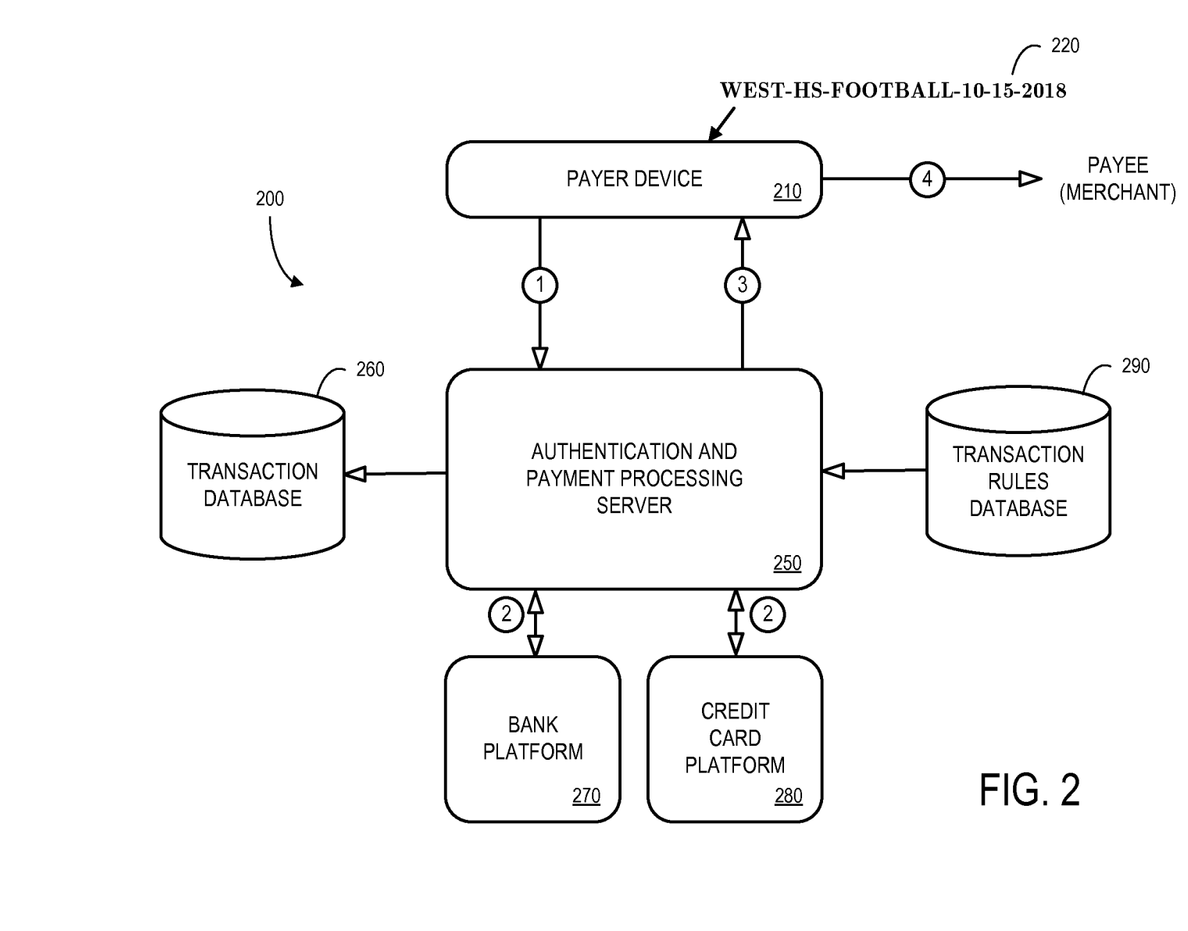
FIG. 2 is an information flow diagram of a system according to some embodiments of the present invention.

FIG. 2 is a high level process flow diagram of an authentication and payment processing system 100 in accordance with some embodiments. In particular, a person or payer may enter a payee identifier 220 into a payer device 210. The payee identifier 220 might be associated with, for example, a school or school district, a charity drive, a particular sporting event or concert, etc. For example, the payer device 210 may automatically use Optical Character Recognition ("OCR") software to determine the payer identifier 202.

At (1), an electronic payment instruction file including a payer identifier and the payee identifier is transmitted from the payer device to an authentication and payment processing server 250. The authorization and payment processing server 250 might be, for example, associated with a Personal Computer ("PC"), laptop computer, an enterprise server, a server farm, and/or a database or similar storage devices. The authorization and payment processing server 250 may, according to some embodiments, be associated with a bank, a credit card company, or any other party.

According to some embodiments, at (2) an "automated" authorization and payment processing server 250 may exchange information about a bank account via a bank platform 270 and/or a credit card account via a credit card platform 280 in connection with a transfer of funds. According to other embodiments, pre-paid storage accounts might be maintained by the authentication and payment processing platform server 250 or any other party. As used herein, the term "automated" may refer to, for example, actions that can be performed with little (or no) intervention by a human.

As used herein, devices, including those associated with the authorization and payment processing server 250 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN, and/or an Internet Protocol ("IP") network such as the Internet, an intranet, or an extranet. Note that any devices described herein may communicate via one or more such communication networks.

The authorization and payment processing server 250 may store data into and/or retrieve data from a transaction database 260. The transaction database 260 might be locally stored or reside remote from the authorization and payment processing server 250. As will be described further below, the transaction database 260 may be used by the authorization and payment processing server 250 to track funds being transferred from payers to payees. According to some embodiments, the authorization and payment processing server 250 communicates information to an external device, such as by transmitting an electronic file to an email server, a workflow management system, etc. In some embodiments, the authorization and payment processing server 250 might retrieve and/or execute business logic from a transaction rules database 290 (e.g., rules established by a parent to control how one or more students will be allowed to spend funds).

Although a single authorization and payment processing server 250 is shown in FIG. 2, any number of such devices may be included. Moreover, various devices described herein might be combined according to embodiments of the present invention. For example, in some embodiments, the authorization and payment processing server 250, transaction database 260 and/or transaction rules database 290 might be co-located and/or may comprise a single apparatus.

In accordance with some embodiments, the systems and methods described herein provide a framework to transfer funds from a payer account to a payee and to provide a conformation of such payment to the payer device at (3) (without transmitting information to any device associated with the payee or merchant). By way of example, and without limiting the generality of the foregoing, a payer account might be associated with a bank account, a credit account, a debit account, and/or any other type of financial account or transaction that may be used to store or transfer funds. As used herein, the term "transaction" can be associated with, for example, a merchant, a school district, a charity drive, an entertainment event, a dance or prom, an online account, and/or any other suitable institution that may be configured to receive a financial payment from a payer account.

The information associated with the bank platform 270 and/or the credit card platform 280 might be associated with, for example, a banking network, a "payment card processing system" or "credit card processing networks," such as the MasterCard® network that allows account owners to use payment cards issued by a variety of issuers to shop at a variety of merchants. With this type of payment card, a card issuer or attribute provider, such as a bank, extends credit to an account owner to purchase products or services. When an account owner makes a purchase from an approved merchant, or withdraws funds via an ATM, the card number and amount of the purchase, along with other relevant information, are transmitted via the processing network to a processing center, which verifies that the card has not been reported lost or stolen and that the card's credit limit has not been exceeded. In some cases, the account owner's signature is also verified, a personal identification number is required or other user authentication mechanisms are imposed. The account owner is required to repay the bank for the purchases or cash withdrawals, generally on a monthly basis.

The transaction database 260 may further store a "business classification," which is a group of merchants and/or businesses, by the type of goods and/or service the merchant and/or business provides. For example, the group of merchants and/or businesses can include merchants and/or business, which provide similar goods and/or services. In addition, the merchants and/or businesses can be classified based on geographical location, sales, and any other type of classification, which can be used to associate a merchant and/or business with similar goods, services, locations, economic and/or business sector, industry and/or industry group. According to some embodiments, different business classifications may be associated with different biometric standards.

The transaction database 260 may also store a Merchant Category Code ("MCC"), which is a four-digit number created by MasterCard® or VISA® and assigned to a business by the acquirer when the business first starts accepting one of these cards as a form of payment. The MCC is used to classify the business by the type of goods or services it provides. For example, in the United States, the merchant category code can be used to determine if a payment needs to be reported to the IRS for tax purposes. In addition, MCCs are used by card issuers to categorize, track or restrict certain types of purchases. According to some embodiments, different MCCs may be associated with different biometric standards.

In accordance with some embodiments, other data associated with transfers of funds from payers to payees is stored within the transaction database 260. The data might include, for example, a listing of payment amounts for each transaction including a transaction date, transaction amount, payer identifier, payee identifier, a type of payment card, etc.

Figure 3:
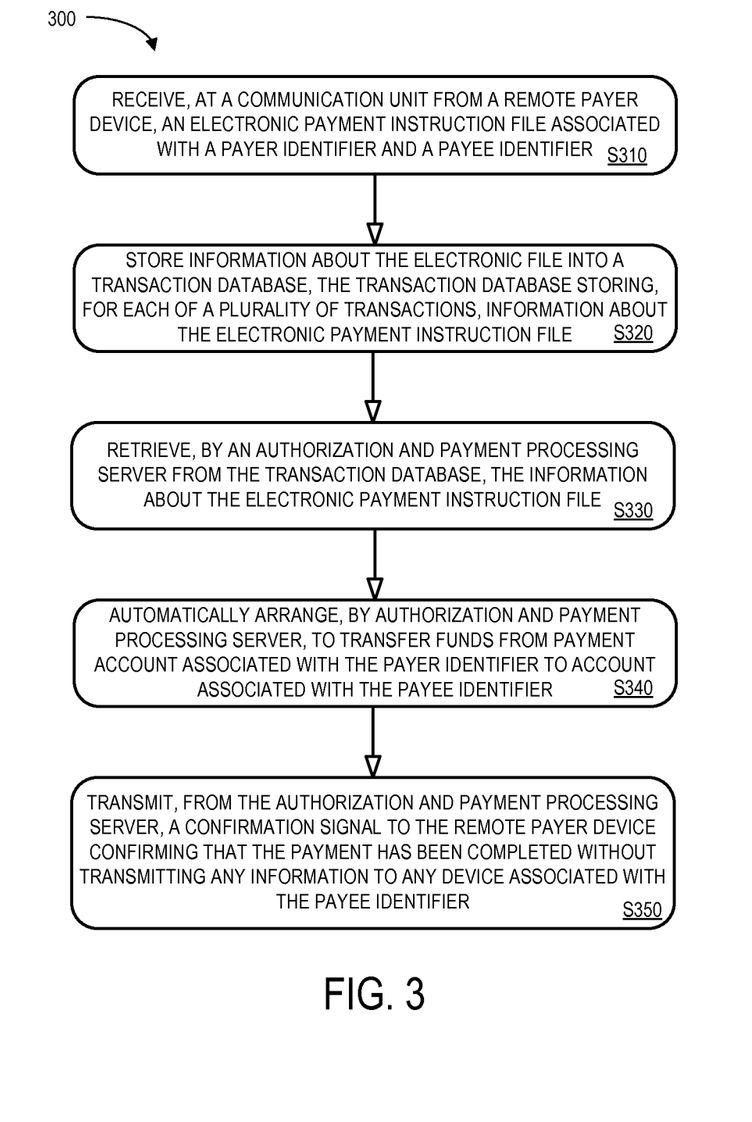
FIG. 3 illustrates a method that might be performed in accordance with some embodiments.

FIG. 3 illustrates an authentication and payment processing method 300 that might be performed by some or all of the elements of the system 200 described with respect to FIG. 2 according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S310, a communication unit may receive an electronic payment instruction file associated with a payer identifier and a payee identifier from a remote payer device (e.g., a smartphone, a camera, and a smart watch). For example, the remote payer device may be a smartphone that determines the payee identifier based on least in part on image information, a Quick Response ("QR") code, a bar code, and/or an alphanumeric string of characters. The payee identifier and/or payee may be associated with, for example, an educational school district, a charity, a children's sports league, and/or an event (e.g., a sporting or entertainment event).

At S320, information about the electronic file may be stored into a transaction database. The transaction database may store, for each of a plurality of transactions, information about the electronic payment instruction file including the payer identifier and the payee identifier. At S330, an authorization and payment processing server may receive, from the transaction database, the information about the electronic payment instruction file, including the payer identifier and the payee identifier.

At S340, the authorization and payment processing server may automatically arrange for funds to be transferred from a payment account associated with the payer identifier to an account associated with the payee identifier. The automatic transfer of funds at S340 may include verifying an availability of funds via a credit card platform and/or a banking platform. According to some embodiments, automatic transfer of funds includes collecting a plurality of electronic payment instruction files and transferring a single batch payment to the payment account associated with the payee identifier.

According to some embodiments, the automatic transfer of funds at S340 includes determining that the payer identifier is associated with a controlling account and verifying that a transaction rule associated with the controlling account is satisfied. For example, a student payer identifier might be associated with a parent's controlling account. The transaction rule might be associated with, for example, a transaction amount (e.g., a student might only be allowed to spend $20.00 each week), a transaction date (e.g., a student might only be allowed to make payments on school days), a transaction time (e.g., evening transactions might be prohibited or require parental approval via a text message), a transaction location, at least one payee identifier (e.g., a student might only be allowed to transfer funds to a particular school or school district), an event type, and/or an approval process. According to some embodiments, an authorization and payment processing server will perform at least one biometric verification process (e.g., comparing fingerprints of a student and/or a parent read at the time of a transaction with pre-stored images of their fingerprints).

At S350, the authorization and payment processing server may transmit a confirmation signal to the remote payer device confirming that the payment has been completed. Note that this may be performed without transmitting any information to any device associated with the payee identifier at the location of the transaction. The confirmation signal may, for example, trigger a confirmation display on the smartphone (which could be then shown to the payee if desired).

Figure 4:
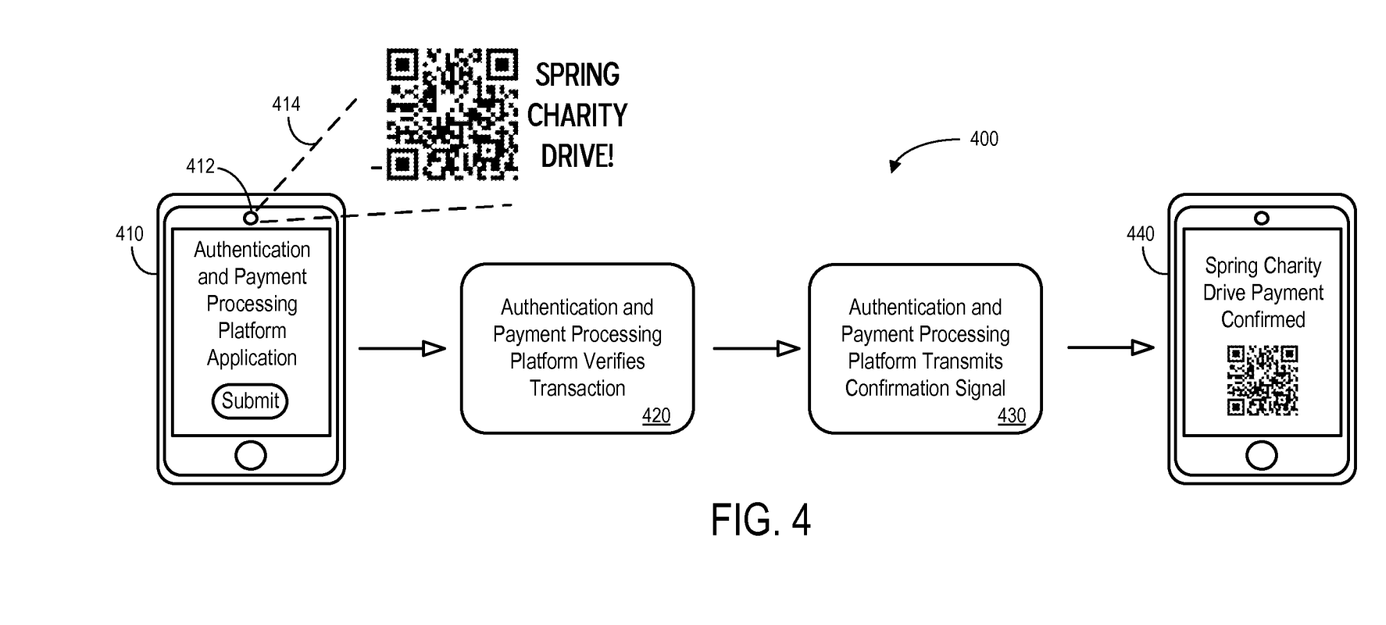
FIGS. 4 and 5 illustrate payer/payee transaction examples according to some embodiments.
Figure 5:
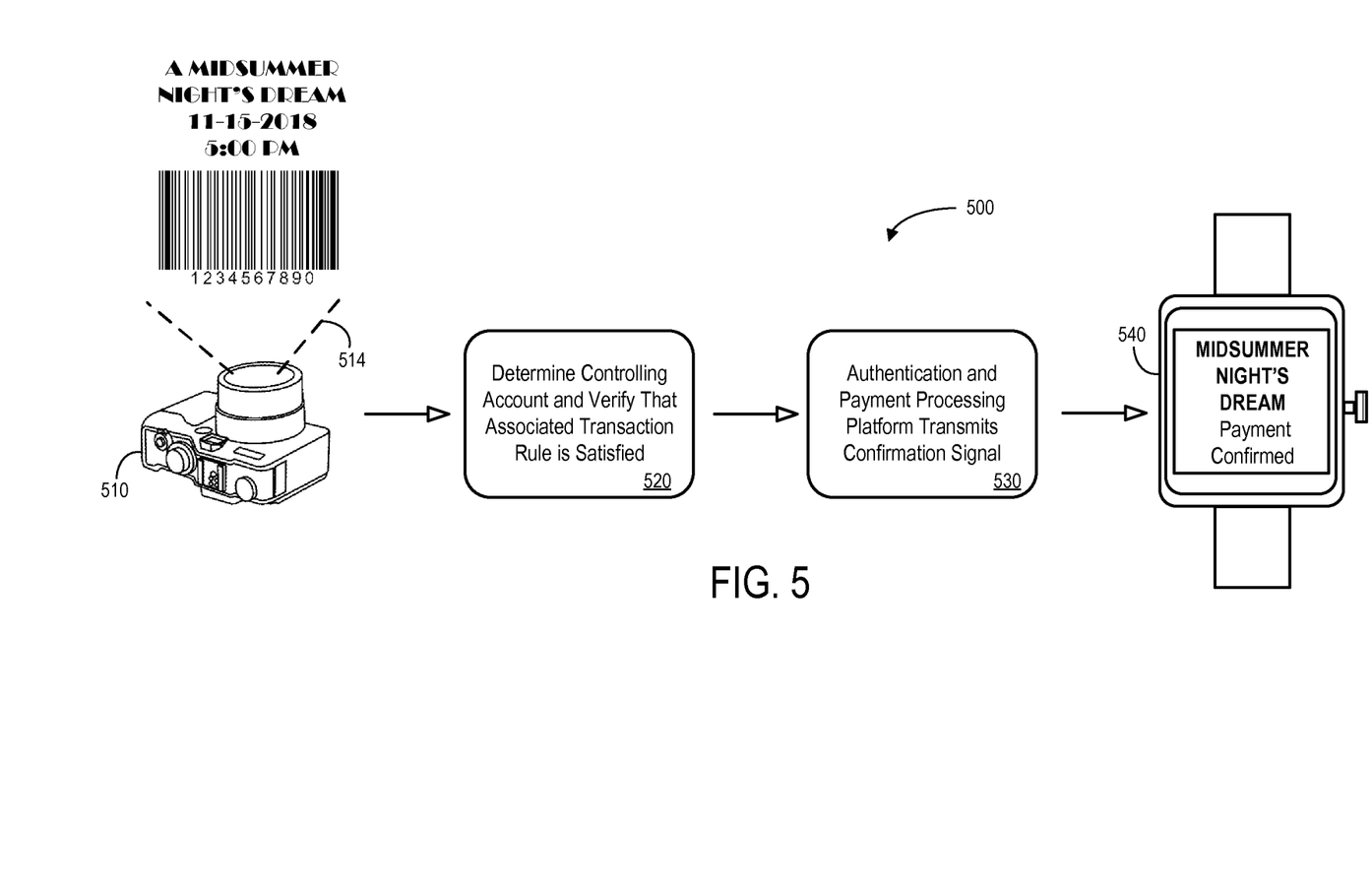

FIGS. 4 and 5 illustrate authentication and payment processing examples according to some embodiments. In FIG. 4, for example, a party wishing to provide funds in connection with a spring charity drive might open an application on his or her smartphone 410. In particular, the application may access a camera 412 of the smartphone to capture a Quick Response ("QR") code within a field of view of the camera 412. The QR code might have been created and provided to the spring charity drive when the owner or sponsor of the charity drive registered with a payment system. After the QR code is captured by the smartphone application, an authentication and payment processing platform may verify the transaction at 420. For example, the authentication and payment processing platform might verify a payment account associated with a payer identifier transmitted by the smartphone application. At 430, the authentication and payment processing platform transmits a confirmation signal to the smartphone 410 indicating that a successful payment to the spring charity drive has been processed. The payer might then show a confirmation display 440 on his or her smartphone to the payee to demonstrate payment. In this way, the spring charity drive might accept payments without needed to install any expensive hardware or software systems.

Similarly, in FIG. 5 a party wishing to provide funds in connection with a high school play might turn on his or her camera 510. In particular, the camera 510 may capture a bar code within a field of view 514. The bar code might have been created and provided to the high school when the school district registered with a payment system. After the bar code is captured by the camera 510, an authentication and payment processing platform may determine if any controlling accounts are associated with the payer at 520. For example, the authentication and payment processing platform might determine that a student's parent allow the student to spend $25 per week using the payment system. At 530, the authentication and payment processing platform transmits a confirmation signal to the payer indicating that a successful payment to the high school play has been processed. The payer might then show a confirmation display on his or her smartwatch 540 to the payee to demonstrate payment. In this way, the school district might accept payments without needed to install any expensive hardware or software systems.

Figure 6:
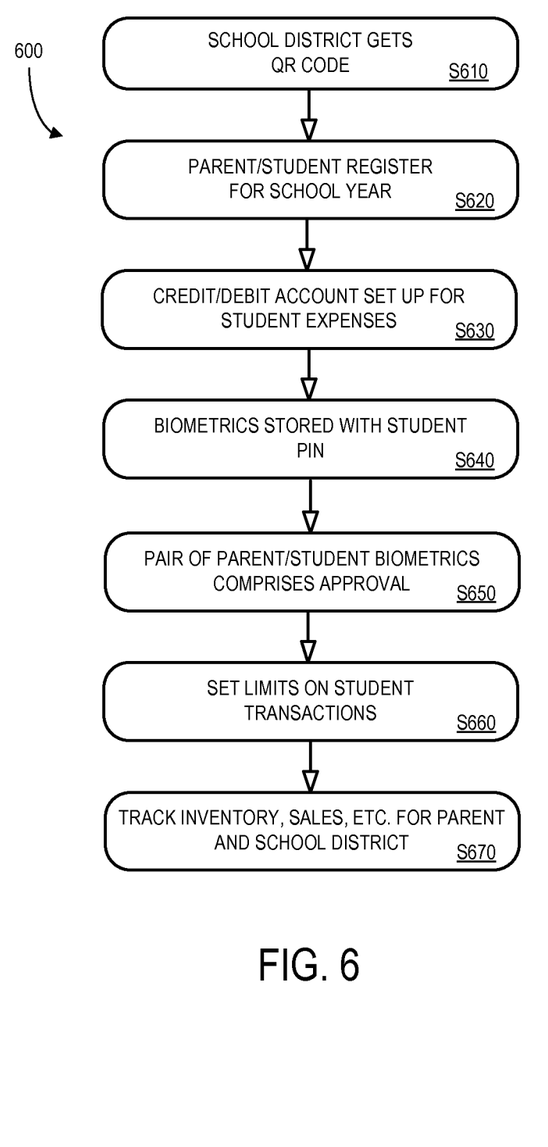
FIG. 6 illustrates a registration method that might be performed in accordance with some embodiments.

FIG. 6 illustrates a registration 600 method that might be performed in accordance with some embodiments. At S610, a school district registers with a payment system (e.g., including the act of providing a payee identifier, such as a bank account number, to the payment system). At S620, a parent registers one or more student children with the payment system (e.g., including the act or providing a payer identifier, such as a credit card or bank account number, to the payment system).

At S630, a credit or debit account may be established in the payment system for student expensed. For example, a credit or debit account may be set up for student expenses, such as field trips, lunches, class dues, etc. At S640, biometrics may be stored for the student and/or parent in connection to a PIN. For example, parent and/or child biometrics may be taken and stored in connection with the student's PIN. A single authentication for a transaction may be made using the child's biometric information at time of purchase with the pre-stored biometric information created when the account was established. At S650, the pairing of parent and student biometric information might comprise approval for a transaction. Such an approval, for example, might be similar to a dual-signature authentication requirement associated with a bank checking account.

At S660, a parent might set one or more limits on student transactions of his or her children. For example, a parent might indicate that a first child should not spend more than $20 per month while a second child is authorized to spend up to $50 per month. The parent may, according to some embodiments, require parental approval for all transactions, transactions that meet a pre-determined criteria, etc. For example, a text message might be sent to a parent when the child attempts to spend more than $10 in a single transaction. In this case, the parent might respond with a "Y" or "N" to the message to approve or disapprove the transaction, respectively. At S670, the payment system might arrange to track inventor, sales, etc. for the parent and/or the school district. For example, a weekly or monthly email report might be automatically transmitted to the parent or the school district summarizing a set of transactions.

Figure 7:
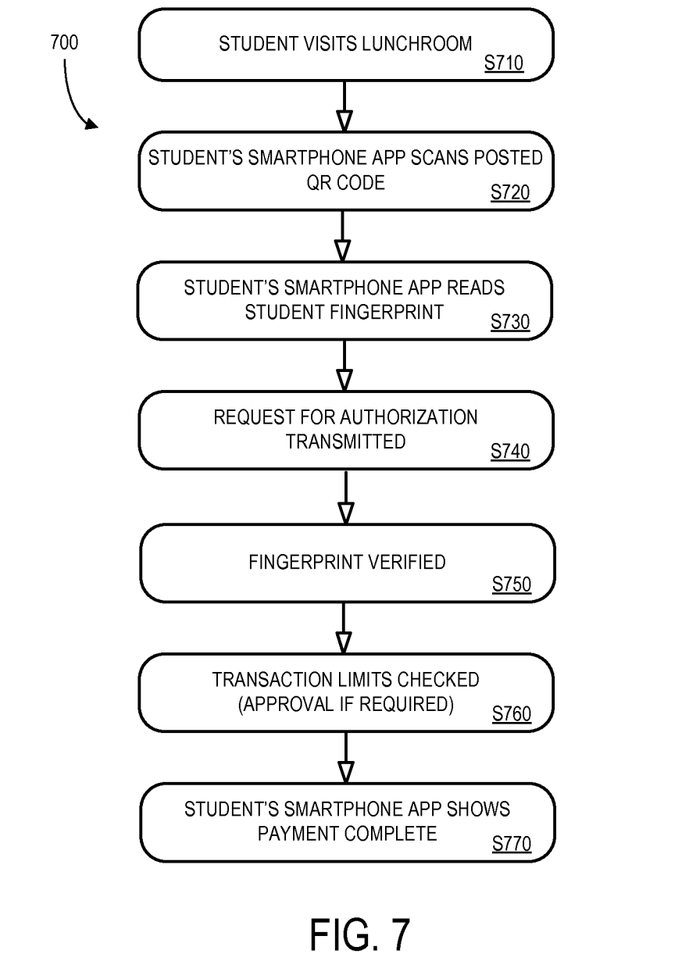
FIG. 7 illustrates a transaction method that might be performed in accordance with some embodiments.

FIG. 7 illustrates a transaction method 700 that might be performed in accordance with some embodiments. At S710, a student may visit a lunchroom or school cafeteria. At S720, the student's smartphone application scans a posted QR code that has been printed out and displayed at location near a cash register. At S730, the student's smartphone application reads the student's fingerprint.

At S740, a payment request for authorization is transmitted from the student's smartphone to an authentication and payment processing server. The request may include fingerprint information to be verified by the authentication and payment processing server. At S750, the student's fingerprint is verified. At S760, transaction limits are checked and approval from the student's parent may be obtained (if required). The authentication and payment processing server may then transmit a confirmation signal to the student's smartphone. At S770, the student's smartphone application displays a "payment complete" confirmation image.

Figure 8:
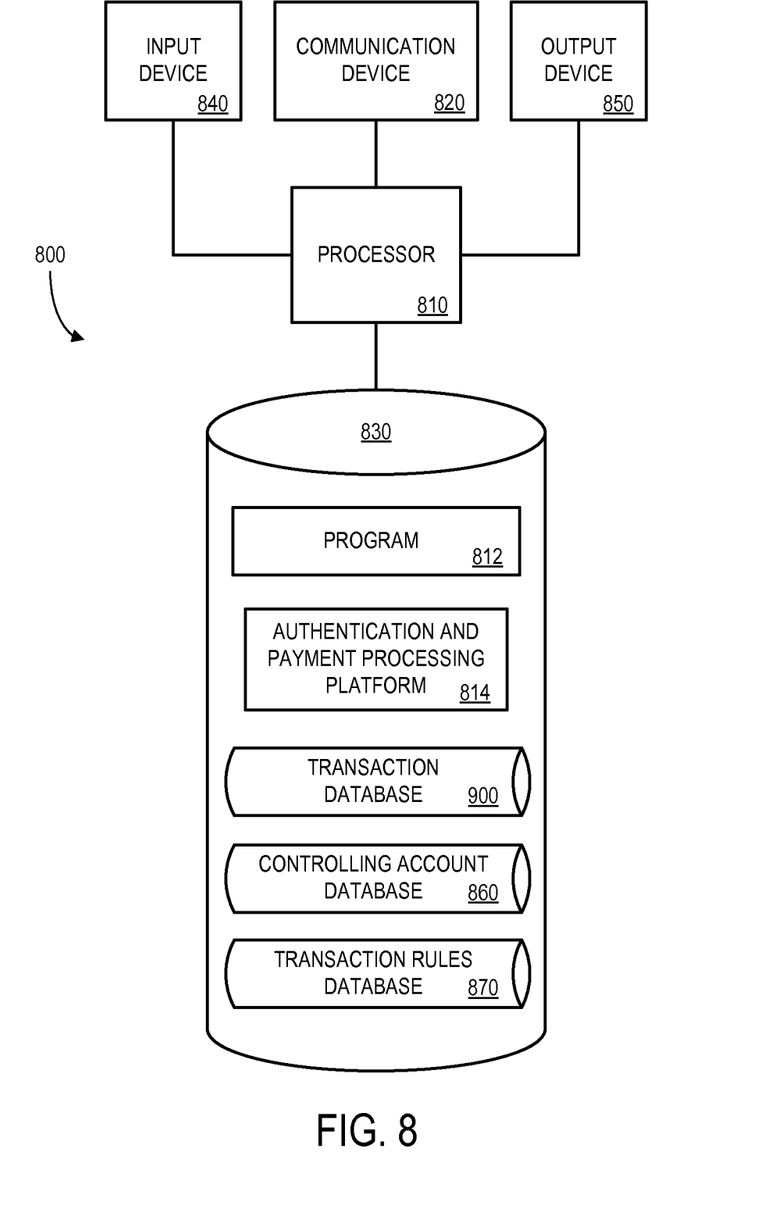
FIG. 8 is block diagram of an authentication and payment processing tool or platform according to some embodiments of the present invention.

In this way, an authorization and payment processing server may facilitate payments to a payee without needing the payee to install particular hardware and/or software systems. Note that the embodiments described herein may be implemented using any number of different hardware configurations. For example, FIG. 8 illustrates an authorization and payment processing server 800 that may be, for example, some or all of the elements associated with the systems 100, 200 of FIGS. 1 and 2. The authorization and payment processing server 800 comprises a processor 810, such as one or more commercially available Central Processing Units ("CPUs") in the form of one-chip microprocessors, coupled to a communication device 820 configured to communicate via a communication network (not shown in FIG. 8). The communication device 820 may be used to communicate, for example, with one or more remote payer devices. The authorization and payment processing server 800 further includes an input device 840 (e.g., a computer mouse and/or keyboard to enter information about user accounts) and an output device 850 (e.g., a computer monitor or printer to output active user or transaction reports).

The processor 810 also communicates with a storage device 830. The storage device 830 may comprise any appropriate information storage device, including combinations of magnetic storage devices (e.g., a hard disk drive), optical storage devices, mobile telephones, and/or semiconductor memory devices. The storage device 830 stores a program 812 and/or authentication and payment processing platform logic 814 for controlling the processor 810. The processor 810 performs instructions of the programs 812, 814, and thereby operates in accordance with any of the embodiments described herein. For example, an electronic payment instruction file associated with a payer identifier and a payee identifier from a remote payer device may be received by the processor 810. Information about the electronic file may be stored into a transaction database. The processor 810 may retrieve, from the transaction database, the information about the electronic payment instruction file and automatically arrange for funds to be transferred from a payment account associated with the payer identifier to an account associated with the payee identifier. The processor 810 may then transmit a confirmation signal to the remote payer device confirming that the payment has been completed without transmitting any information to any device associated with the payee identifier at the location of the transaction.

The programs 812, 814 may be stored in a compressed, uncompiled and/or encrypted format. The programs 812, 814 may furthermore include other program elements, such as an operating system, a database management system, and/or device drivers used by the processor 810 to interface with peripheral devices.

As used herein, information may be "received" by or "transmitted" to, for example: (i) the authorization and payment processing server 800 from another device; or (ii) a software application or module within the authorization and payment processing server 800 from another software application, module, or any other source.

In some embodiments (such as shown in FIG. 8), the storage device 830 further stores a transaction database 900, a controlling account database 860 (e.g., to store information about parental accounts), and a transaction rules database 870 (e.g., to store information about particular spending limits, category restrictions, etc.). One example of a database that may be used in connection with the authorization and payment processing server 800 will now be described in detail with respect to FIG. 9. Note that the database described herein is only an example, and additional and/or different information may actually be stored therein. Moreover, various databases might be split or combined in accordance with any of the embodiments described herein. For example, the transaction database 900 and/or the controlling account database 860 might be combined, co-located, and/or linked to each other within the authorization and payment processing server 800.

Figure 9:
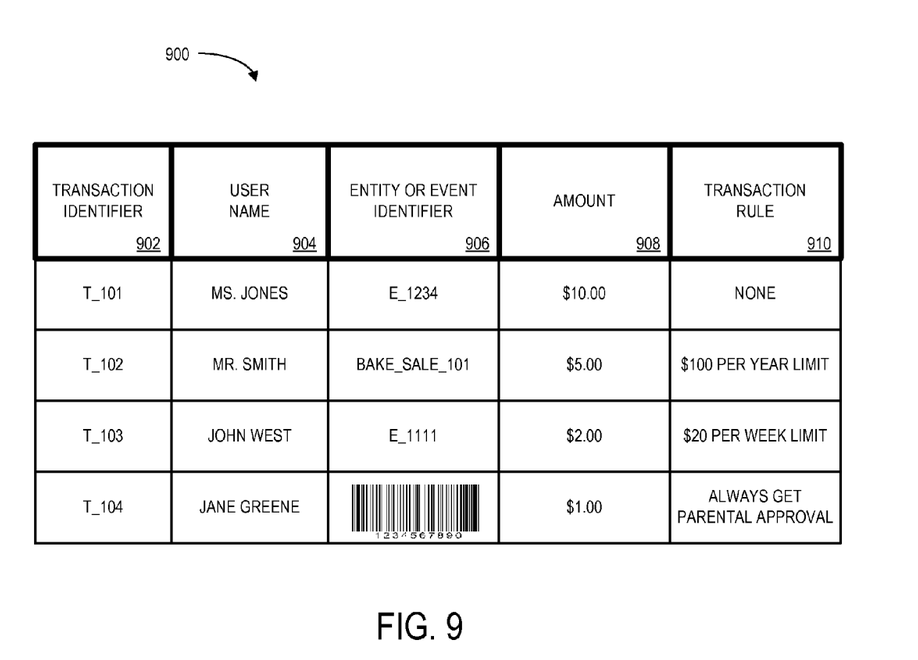
FIG. 9 is a tabular portion of a transaction database according to some embodiments.

Referring to FIG. 9, a table is shown that represents the transaction database 900 that may be stored at the authorization and payment processing server 800 according to some embodiments. The table may include, for example, entries identifying transactions that have been, or are being, processed (e.g., to transfer funds from payers to payees). The table may also define fields 902, 904, 906, 908, 910 for each of the entries. The fields 902, 904, 906, 908, 910 may, according to some embodiments, specify: a transaction identifier 902, a user name 904, an entity or event identifier 906, an amount 908, and a transaction rule 910. The transaction database 900 may be created and updated, for example, based on information electrically received from remote payer devices.

The transaction identifier 902 may be, for example, a unique alphanumeric code identifying a payer attempting to transfer funds to a payee. Note that other information might also be stored in the transaction database 900, such as a transaction date, a payee party name or account identifier, a PAN, an expiration date, a CVC, etc. The user name 904 might identify the payer and the entity or event identifier 906 might define the payee (e.g., the party who is to receive the funds as a result of the transaction). The amount 908 might define a monetary value, and the transaction rule 910 might indicate one or more spending limits, category restrictions, etc. that must be satisfied in order for the transaction to be approved by the system.

Figure 10:
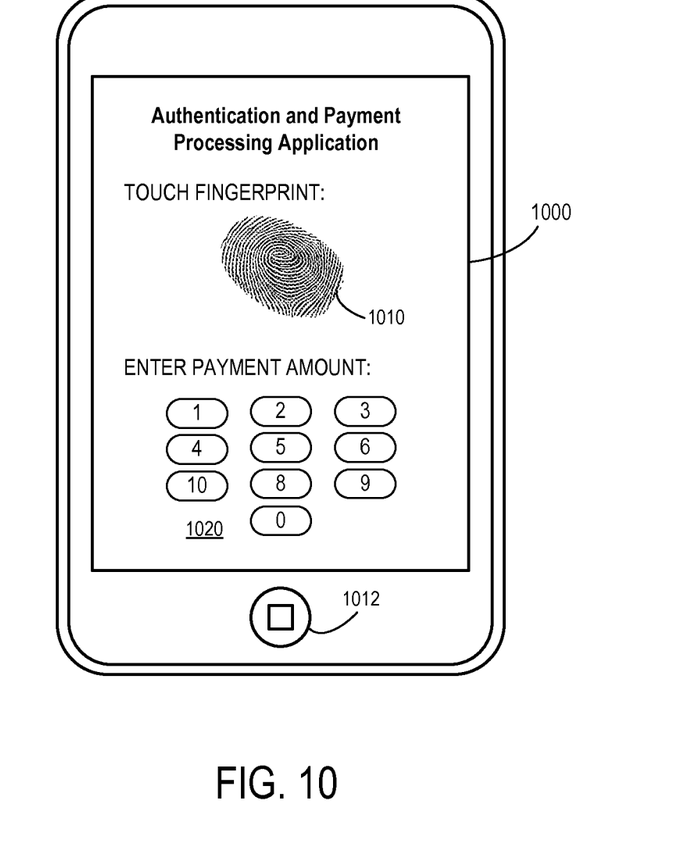
FIG. 10 illustrates a smartphone authentication and payment processing display according to some embodiments.

FIG. 10 illustrates a smartphone authentication and payment processing application display 1000 according to some embodiments. The display 1000 might, for example, run on the user's smartphone and allow the user to capture an image 1010 of his or her fingerprint. The smartphone may include a touchscreen that can read fingerprints and/or a separate fingerprint scanner 1012 to verify the identity of the user. An application running on the smartphone may then execute a transmission process to automatically send a payment instruction to a remote authentication and payment processing server. The display 1000 may further include an area 1020 including a keypad that can be used by the user to enter a payment amount, a date, payee identifier, etc.

Figure 11:
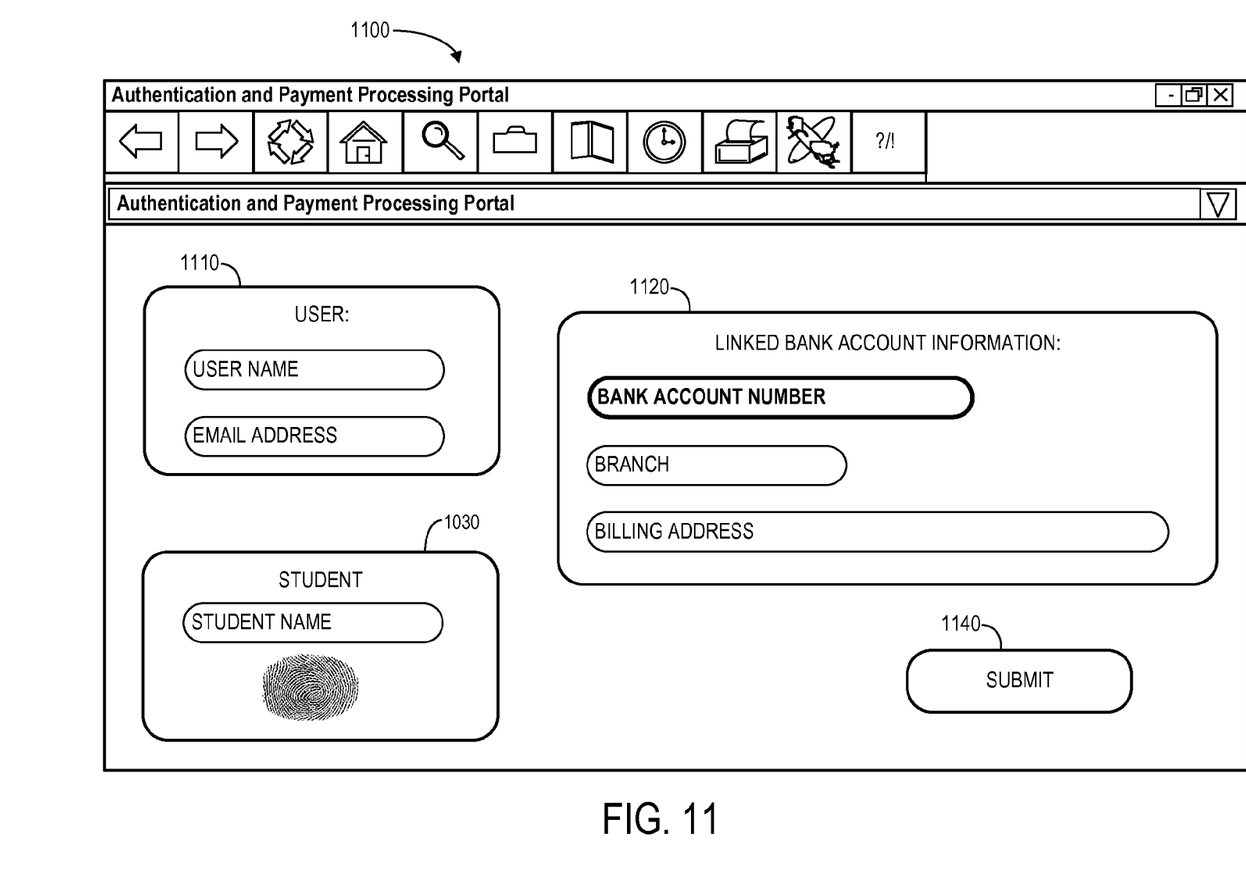
FIG. 11 illustrates an authentication and payment processing portal display in accordance with some embodiments.

FIG. 11 illustrates an authentication and payment processing portal display 1100 (e.g., a web portal display) that might be provided in accordance with some embodiments. The portal display 1100 may include, for example, a first area 1110 where a user may define or alter a name associated with an authentication and payment processing account, an email address associated with the payer party (student or parent), etc. The portal display 1100 may further include a second area 1120 where a user may define or alter one or more payment accounts associated with the application (e.g., a bank account number, branch, billing address, etc.). The display 1100 may also include a biometric information area 1030 that can store and/or alter fingerprint information, voice data, etc. Selection of a "Submit" icon 1140 may apply any changes to his or her account and/or initiate a creation of an authentication and payment processing account.

Thus, according to some embodiments, an improved authorization and payment processing server might facilitate a transfer funds from a payer to a payee. Moreover, the transfer of funds may be made without the payee needing install and maintain hardware and/or software system. The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A system to facilitate transactions from a payer to a payee, comprising:
    (a) a communication unit programmed to:
        (i) receive, from a remote payer device, an electronic payment instruction file associated with a payer identifier and a payee identifier, the electronic payment instruction file for implementing a transaction in which funds are transferred from a payer to a payee, the payer identified by the payer identifier, the transaction being one of a plurality of transactions handled by the system, the payee identified by the payee identifier, the transaction initiated by the payee at a transaction location, and
        (ii) store information about the electronic payment instruction file into a transaction database;
    (b) the transaction database storing, for each of the plurality of transactions, information about the electronic payment instruction file including the payer identifier and the payee identifier; and
    (c) an authorization and payment processing server, coupled to the transaction database, programmed to:
        (iii) retrieve, from the transaction database, the information about the electronic payment instruction file, including the payer identifier and the payee identifier,
        (iv) automatically implement the transaction to cause said funds to be transferred from a payment account associated with the payer identifier to an account associated with the payee identifier, wherein the automatic transfer of funds includes verifying an availability of funds via at least one of: a credit card platform, and a banking platform, and
        (v) transmit a confirmation signal to the remote payer device confirming that the transaction has been completed, said confirmation signal to be displayed on the remote payer device at the transaction location for viewing by the payee on the remote payer device, said authorization and payment processing server not transmitting any confirmation signal to any other device at the transaction location.

2. The system of claim 1, wherein the remote payer device is a smartphone that determines the payee identifier based on least in part on: image information, a Quick Response ("QR") code, a bar code, and an alphanumeric string of characters.

3. The system of claim 2, wherein the payee is associated with at least one of: an educational school district, a charity, a children's sports league, and an event.

4. The system of claim 2, wherein the confirmation signal triggers a confirmation display on the smartphone.

5. The system of claim 1, wherein the automatic transfer of funds includes collecting a plurality of electronic payment instruction files and transferring a single batch payment to the payment account associated with the payee identifier.

6. The system of claim 1, wherein the automatic transfer of funds includes determining that the payer identifier is associated with a controlling account and verifying that a transaction rule associated with the controlling account is satisfied.

7. The system of claim 6, wherein the transaction rule is associated with at least one of: a transaction amount, a transaction date, a transaction time, a transaction location, at least one payee identifier, an event type, and an approval process.

8. The system of claim 1, wherein the authorization and payment processing server performs at least one biometric verification process.

9. A computer-implemented method to facilitate transactions from a payer to a payee, comprising:
    receiving, at a communication unit from a remote payer device, an electronic payment instruction file associated with a payer identifier and a payee identifier, the electronic payment instruction file for implementing a transaction in which funds are transferred from a payer to a payee, the payer identified by the payer identifier, the transaction being one of a plurality of transactions, the payee identified by the payee identifier, the transaction initiated by the payee at a transaction location;
    storing information about the electronic payment instruction file into a transaction database, the transaction database storing, for each of the plurality of transactions, information about the electronic payment instruction file including the payer identifier and the payee identifier;
    retrieving, by an authorization and payment processing server from the transaction database, the information about the electronic payment instruction file, including the payer identifier and the payee identifier;
    automatically implementing the transaction by the authorization and payment processing server, to cause said funds to be transferred from a payment account associated with the payer identifier to an account associated with the payee identifier, wherein the automatic transfer of funds includes verifying an availability of funds via at least one of: a credit card platform, and a banking platform; and
    transmitting, from the authorization and payment processing server, a confirmation signal to the remote payer device confirming that the transaction has been completed, said confirmation signal to be displayed on the remote payer device at the transaction location for viewing by the payee on the remote payer device, said authorization and payment processing server not transmitting any confirmation signal to any other device at the transaction location.

10. The method of claim 9, wherein the remote payer device is a smartphone that determines the payee identifier based on least in part on: image information, a Quick Response ("QR") code, a bar code, and an alphanumeric string of characters.

11. The method of claim 10, wherein the payee is associated with at least one of: an educational school district, a charity, a children's sports league, and an event.

12. The method of claim 10, wherein the confirmation signal triggers a confirmation display on the smartphone.

13. The method of claim 9, wherein the automatic transfer of funds includes collecting a plurality of electronic payment instruction files and transferring a single batch payment to the payment account associated with the payee identifier.

14. The method of claim 9, wherein the automatic transfer of funds includes determining that the payer identifier is associated with a controlling account and verifying that a transaction rule associated with the controlling account is satisfied.

15. The method of claim 14, wherein the transaction rule is associated with at least one of: a transaction amount, a transaction date, a transaction time, a transaction location, at least one payee identifier, an event type, and an approval process.

16. The method of claim 1, wherein the authorization and payment processing server performs at least one biometric verification process.

\* \* \* \* \*